(12) United States Patent
Oki

(10) Patent No.: US 9,667,833 B2
(45) Date of Patent: May 30, 2017

(54) HISTORY GENERATING APPARATUS AND HISTORY GENERATING METHOD

(71) Applicant: Konica Minolta, Inc., Tokyo (JP)

(72) Inventor: Makoto Oki, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/878,574

(22) Filed: Oct. 8, 2015

(65) Prior Publication Data

US 2016/0105586 A1    Apr. 14, 2016

(30) Foreign Application Priority Data

Oct. 10, 2014  (JP) ................................ 2014-208753

(51) Int. Cl.
| | |
|---|---|
| *H04N 1/41* | (2006.01) |
| *G06K 9/00* | (2006.01) |
| *H04N 1/00* | (2006.01) |
| *H04N 1/32* | (2006.01) |
| *H04N 1/52* | (2006.01) |

(52) U.S. Cl.
CPC ....... *H04N 1/4105* (2013.01); *G06K 9/00456* (2013.01); *H04N 1/0032* (2013.01); *H04N 1/00278* (2013.01); *H04N 1/3247* (2013.01); *H04N 1/32459* (2013.01); *H04N 1/52* (2013.01)

(58) Field of Classification Search
None
See application file for complete search history.

(56) References Cited

U.S. PATENT DOCUMENTS

| | | | |
|---|---|---|---|
| 6,333,994 B1 * | 12/2001 | Perrone | G06K 9/222 382/181 |
| 2005/0180645 A1 * | 8/2005 | Hasegawa | G06K 9/00456 382/239 |
| 2008/0253647 A1 | 10/2008 | Cho et al. | |
| 2009/0074291 A1 | 3/2009 | Iinuma | |
| 2010/0329548 A1 | 12/2010 | Yoshimura | |
| 2011/0158532 A1 * | 6/2011 | Chung | G06K 9/3258 382/176 |

(Continued)

FOREIGN PATENT DOCUMENTS

| | | |
|---|---|---|
| EP | 1555804 A2 | 7/2005 |
| JP | H07-296140 A | 11/1995 |

(Continued)

OTHER PUBLICATIONS

Extended Search Report issued in corresponding European Application No. 15187589.5, mailed May 10, 2016 (8 pages).

*Primary Examiner* — Christopher D Wait

(74) *Attorney, Agent, or Firm* — Osha Liang LLP

(57) ABSTRACT

A history generating apparatus includes an image generating section, an image reading section and a history generating section. The image generating section generates a bitmap first image and generates initial attribute information indicating attributes of respective pixels of the first image. The image reading section reads an image based on the first image formed on paper so as to generate a bitmap second image. The history generating section separates the second image into image regions by attribute indicated by the initial attribute information, performs image processing on each of the image regions according to the attribute and combines the image regions so as to generate a history image.

13 Claims, 11 Drawing Sheets

(56) References Cited

U.S. PATENT DOCUMENTS

2012/0147397 A1* 6/2012 Kawamoto .......... H04N 1/6033
358/1.9
2013/0051699 A1* 2/2013 Gupta ................... G06F 17/211
382/282

FOREIGN PATENT DOCUMENTS

| JP | 2005-205853 A | 8/2005 |
| JP | 2011-010023 A | 1/2011 |

* cited by examiner

HISTORY GENERATING APPARATUS AND HISTORY GENERATING METHOD

FIELD OF THE INVENTION

The present invention relates to a history generating apparatus and a history generating method.

DESCRIPTION OF THE RELATED ART

In an image forming device, as a history of an image formed on paper, the original (initial) bitmap image input for image formation is saved. (Refer to, for example, Japanese Patent Application Publication No. 7-296140.) However, at the time of image formation, a text (character(s)) such as a page number is added and/or image processing such as page combining to arrange images of a plurality of pages on one page by reducing the images is performed, for example. Hence, the original image is not always an accurate history.

In the case where an image formed on paper is examined, an image reading device disposed on a paper conveyance path reads the image thereon. (Refer to, for example, Japanese Patent Application Publication No. 2005-205853.) The image read by the image reading device is the actually-formed image. Therefore, this image can be an accurate history. However, images for examination are read at a high resolution. Hence, the data amount thereof is large. Then, a mass storage resource is required for saving the images, so that the images are unsuitable for the history.

The data amount can be reduced by performing a compression process on each read image. However, if, because of that, image quality thereof decreases and a text (character(s)) or the like in the image cannot be identified, it cannot be known to which printed matter the image belongs, and the image loses its utility value as the history.

The image may be separated into image regions by attribute such as the attribute of a text (attribute Text) and the attribute of a picture (attribute Image), and the compression format may be changed for each of the image regions. (Refer to, for example, Japanese Patent Application Publication No. 2011-10023.) However, to perform the compression process as described above, the attribute of each image region need to be determined. This requires process steps and process time for determination of the attribute and increases costs.

BRIEF SUMMARY OF THE INVENTION

Objects of the present invention include efficiently generating a high-quality history image having a small data amount.

In order to achieve at least one of the above objects, according to a first aspect of a preferred embodiment of the present invention, there is provided a history generating apparatus including: an image generating section which generates a bitmap first image and generates initial attribute information indicating attributes of respective pixels of the first image; an image reading section which reads an image based on the first image formed on paper so as to generate a bitmap second image; and a history generating section which separates the second image into image regions by attribute indicated by the initial attribute information, performs image processing on each of the image regions according to the attribute and combines the image regions so as to generate a history image.

According to a second aspect of the preferred embodiment of the present invention, there is provided a history generating method including: generating a bitmap first image and generating initial attribute information indicating attributes of respective pixels of the first image; reading an image based on the first image formed on paper so as to generate a bitmap second image; and separating the second image into image regions by attribute indicated by the initial attribute information, performing image processing on each of the image regions according to the attribute and combining the image regions so as to generate a history image.

BRIEF DESCRIPTION OF THE SEVERAL VIEWS OF THE DRAWING

The present invention is fully understood from the detailed description given hereinafter and the accompanying drawings, which are given by way of illustration only and thus are not intended to limit the present invention, wherein.

DETAILED DESCRIPTION OF THE INVENTION

Hereinafter, an embodiment of a history generating apparatus and a history generating method of the preset invention is described with reference to the drawings.

Figure 1:
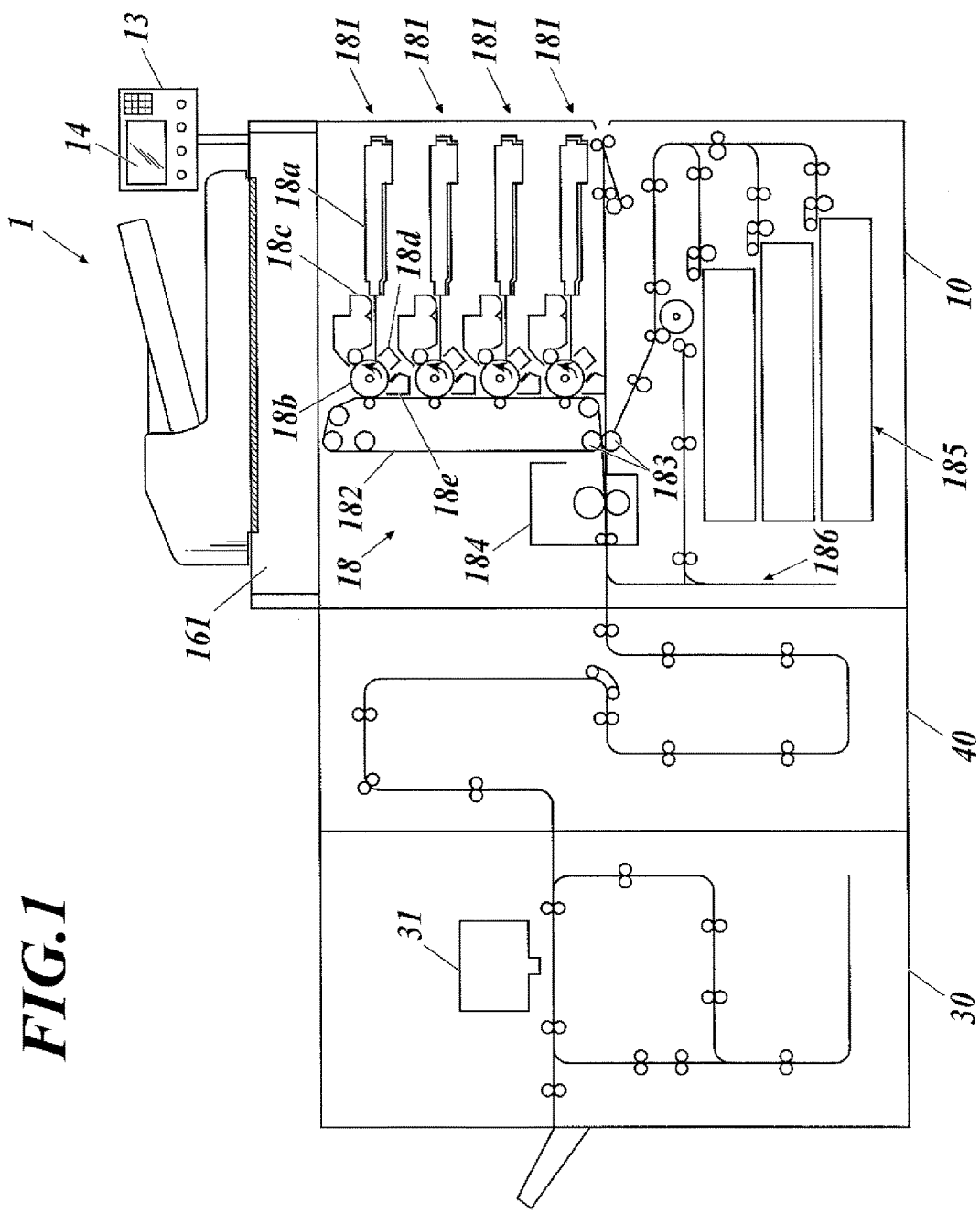
FIG. 1 schematically shows the configuration of an image forming system according to an embodiment of the present invention.

FIG. 1 schematically shows the configuration of an image forming system 1 which is an embodiment of the history generating apparatus of the present invention.

As shown in FIG. 1, the image forming system 1 includes an image forming device 10 and an image reading device 30. The image forming device 10 forms images on paper, and the image reading device 30 reads images on paper. Images generated by the image forming device 10 to form images on paper (image formation) are referred to as first images, and images generated by the image reading device 30 reading images on paper are referred to as second images.

Between the image forming device 10 and the image reading device 30, a carrying unit 40 which carries paper from the image forming device 10 to the image reading device 30 is disposed.

Figure 2:
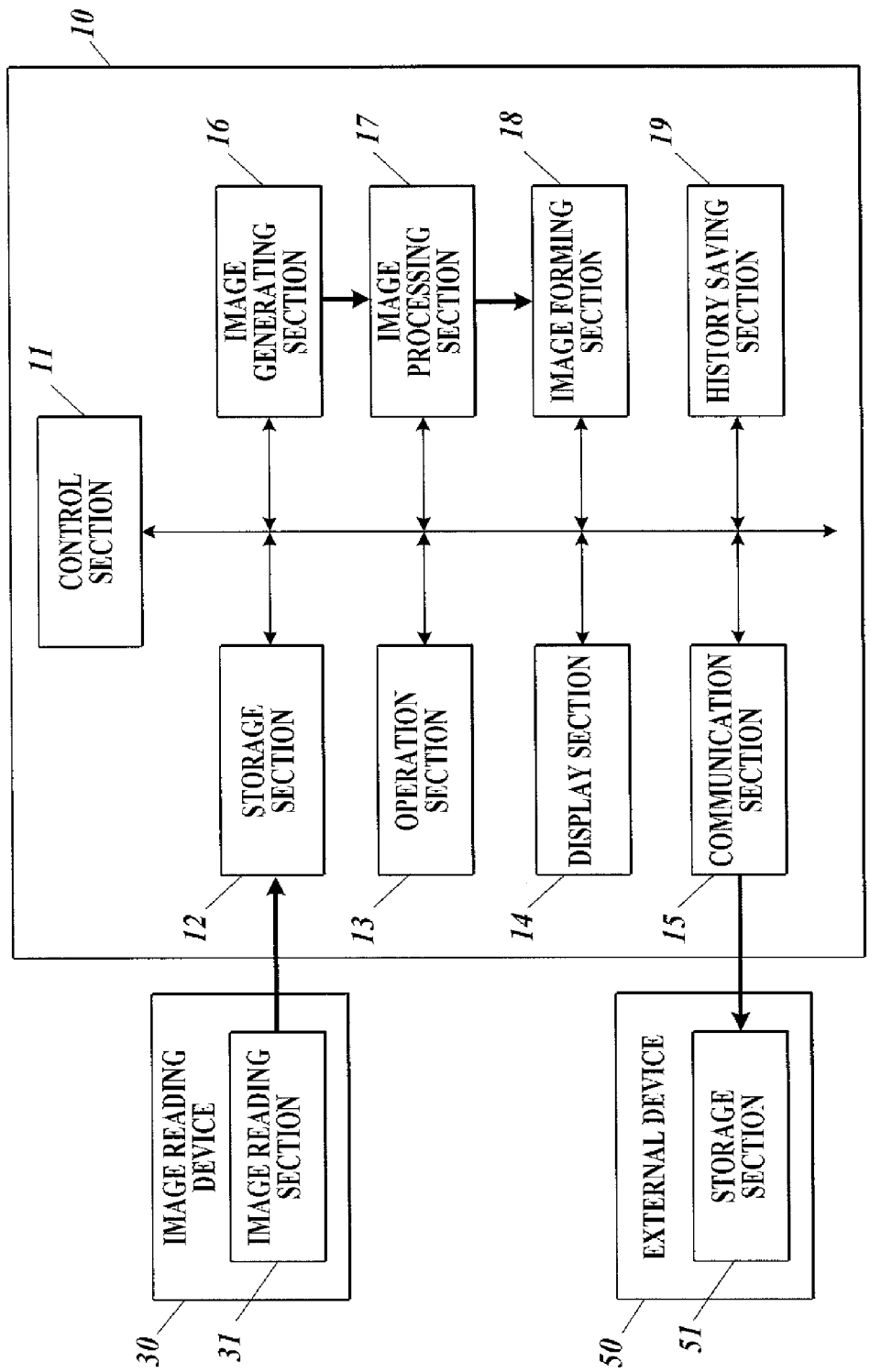
FIG. 2 is a block diagram showing functional components of an image forming device and an image reading device shown in FIG. 1.

FIG. 2 shows the main functional components of the image forming device 10 and the image reading device 30.

As shown in FIG. 2, the image forming device 10 includes a control section 11, a storage section 12, an operation section 13, a display section 14, a communication section 15, an image generating section 16, an image processing section 17, an image forming section 18 and a history saving section 19.

The image forming device 10 is connected to an external device 50 on a network and can communicate with the external device 50 through the communication section 15.

The control section 11 reads programs stored in the storage section 12 and executes the programs, thereby controlling the sections and the like of the image forming device 10. The control section 11 includes a CPU (Central Processing Unit) and a RAM (Random Access Memory).

The control section 11 makes the image processing section 17 process (i.e., perform image processing on) first images generated by the image generating section 16 and makes the image forming section 18 form images on paper according to gradation values of pixels of the processed first images, for example.

The storage section 12 stores therein the programs readable by the control section 11, data used for execution of the programs and the like.

The storage section 12 can also store (save) therein initial attribute information generated by the image generating section 16, second images generated by the image reading device 30, additional attribute information and images for a history (history images) generated in the history saving section 19 and the like.

As the storage section 12, a mass memory such as a hard disk can be used.

The operation section 13 and the display section 14 are provided as a user interface as shown in FIG. 1.

The operation section 13 generates operation signals corresponding to user operations and outputs the signals to the control section 11. As the operation section 13, a touchscreen integrated with keys and the display section 14 can be used, for example.

The display section 14 displays an operation screen and the like by following instructions from the control section 11. As the display section 14, an LCD (Liquid Crystal Display), an OELD (Organic Electro Luminescence Display) or the like can be used.

The communication section 15 communicates with the external device 50 on a network. Examples of the external device 50 include a user terminal, a server and another image forming device (i.e., not the image forming device 10).

The communication section 15 receives data (PDL data) described in a page description language (PDL) from the external device 50 which is a user terminal via the network, for example. The communication section 15 can also send, for example, additional attribute information and history images generated in the history saving section 19 to the external device 50.

The image generating section 16 rasterizes the PDL data received by the communication section 15 to generate bitmap first images of C (cyan), M (magenta), Y (yellow) and K (black) (or may be a first image of K (black) in the case of black-and-white printing) the pixels of each of which have their respective gradation values. The gradation values are data values representing tone of each image. For example, 8-bit data values represent the tone in 0 to 255 gradations, respectively.

When generating the first images, the image generating section 16 generates initial attribute information indicating attributes of the pixels of the first images.

For example, the image generating section 16 determines attributes of pixels of an image of kana, alphabet, number or the like drawn on the basis of character codes described in PDL data as Text; determines attributes of pixels of an image of a ruled line, a polygon, a circle or the like drawn in a vector format such as DXF, SVG or WMF as Graphics; and determines attributes of pixels of an image of a picture or the like drawn on the basis of a file in JPEG or the like as Image.

The image generating section 16 includes, as shown in FIG. 1, an image reading section 161 for copying. The image generating section 16 can also generate C, M, Y and K images by reading, with the image reading section 161, images on documents set by a user so as to obtain R (red), G (green) and B (blue) images and performing color conversion thereon.

The image processing section 17 performs image processing, exemplified by gradation processing and halftone processing, on the first images generated by the image generating section 16.

The gradation processing is processing to convert (correct) gradation values of pixels of an image into gradation values such that density characteristics of an image formed on paper match target density characteristics.

The halftone processing is exemplified by error diffusion and screening employing ordered dithering.

The image forming section 18 forms an image composed of multiple colors (C, M, Y and K) according to gradation values of pixels of the first images processed by the image processing section 17.

The image forming section 18 includes, as shown in FIG. 1, four writing units 181, an intermediate transfer belt 182, a pair of secondary transfer rollers 183, a fixing device 184, paper feed trays 185 and a reversal mechanism 186. The writing units 181 are disposed in series along the belt surface of the intermediate transfer belt 182. The intermediate transfer belt 182 rotates by being wounded around a plurality of rollers. One of the roller is one of the secondary transfer rollers 183. The secondary transfer rollers 183 and the fixing device 184 are disposed on a paper conveyance path for paper carried from the paper feed trays 185. The paper feed trays 185 house paper.

The four writing units 181 form C, M, Y and K images, respectively. The writing units 181 are the same in configuration, and each of them includes an exposure unit 18a, a photoreceptor 18b, a developing unit 18c, a charger 18d and a cleaner 18e.

In each writing unit 181, the charger 18d applies a voltage to the photoreceptor 18b so as to charge the photoreceptor 18b, the exposure unit 18a irradiates the photoreceptor 18b with laser beams according to gradation values of pixels of a C, M, Y or K image so as to expose the photoreceptor 18b, and then the developing unit 18c supplies a color (C, M, Y or K) material such as a toner to develop an electrostatic latent image formed on the photoreceptor 18b. Thus, the C, M, Y and K images are formed on the photoreceptors 18b of the respective writing units 181.

The C, M, Y and K images on the respective photoreceptors 18b are successively transferred onto the intermediate transfer belt 182 so as to be superposed on top of each other, whereby an image composed of multiple colors (C, M, Y and K) is formed on the intermediate transfer belt 182. After the C, M, Y and K images are transferred thereonto, the cleaners 18e of the writing units 181 remove the color materials remaining on the respective photoreceptors 18b.

When paper is supplied from any one of the paper feed trays 185 and the image composed of the multiple colors on the intermediate transfer belt 182 is transferred onto the paper by the secondary transfer rollers 183, the fixing device 184 heats and presses the paper so as to fix the image to the paper. In the case where the image is formed on both sides of the paper, the paper is reversed by the reversal mechanism 186 and carried to the secondary transfer rollers 183 again.

The history saving section 19 generates a history image, which shows a history of performed image formation, by using a second image(s) generated by an image reading section 31 reading an image(s) formed on paper, and saves the history image in the storage section 12.

Figure 3:
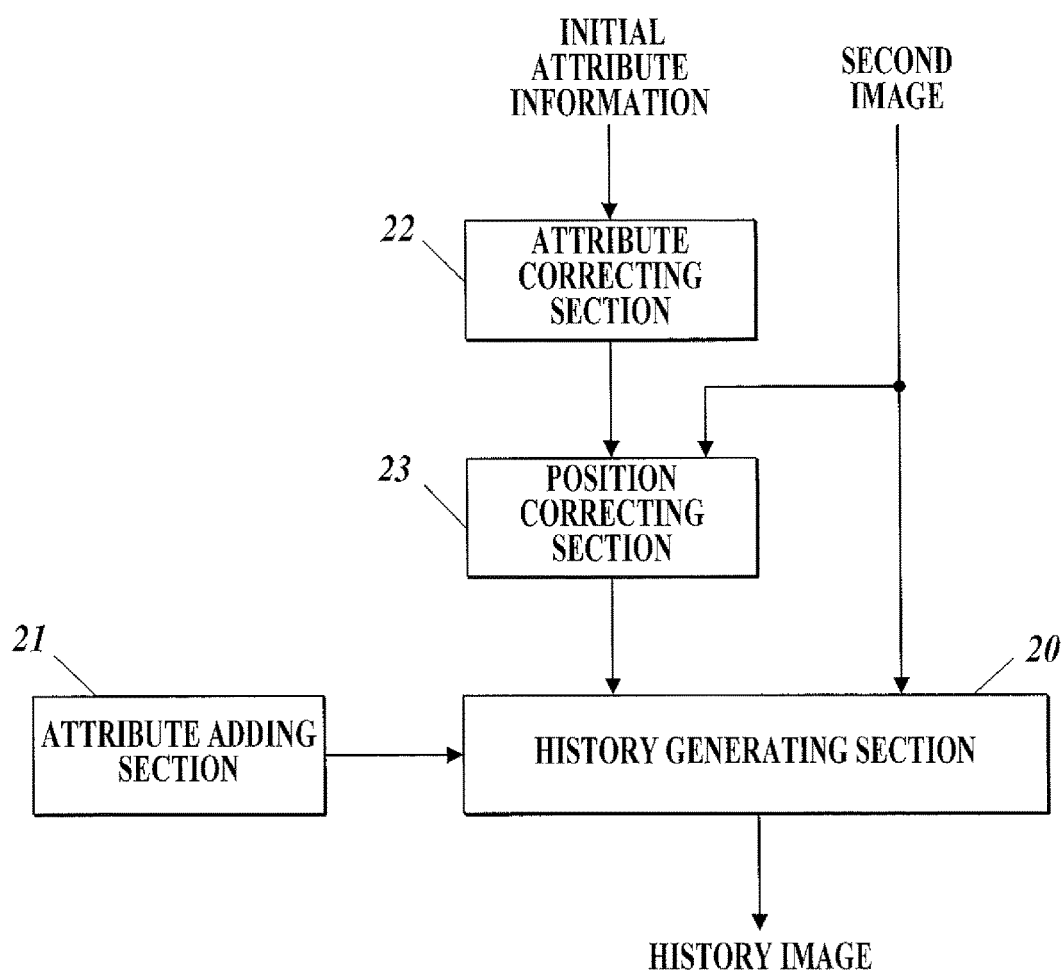
FIG. 3 is a block diagram showing functional components of a history saving section shown in FIG. 2.

The history saving section 19 includes, as shown in FIG. 3, a history generating section 20, an attribute adding section 21, an attribute correcting section 22 and a position correcting section 23.

The history generating section 20 separates a second image into image regions by attribute indicated by the initial attribute information corrected by the attribute correcting section 22 and the position correcting section 23, performs image processing on each of the image regions according to the attribute and then combines the image regions so as to generate the history image.

In the case where there is additional attribute information generated by the attribute adding section 21, the history generating section 20 separates a region indicated by the additional attribute information from the second image as an image region having an attribute Text (hereinafter referred to as a "text region").

The attribute adding section 21 generates the additional attribute information indicating that the attribute of the image region in the second image specified as a text region by a user through the operation section 13 is Text (attribute Text) and saves the additional attribute information in the storage section 12.

The attribute correcting section 22 corrects the initial attribute information generated by the image generating section 16 in such a way as to indicate the attributes of the first images processed by the image processing section 17.

The position correcting section 23 corrects either the attribute information corrected by the attribute correcting section 22 or the second image such that the position of a text indicated by the corrected attribute information matches the position of the text in the second image.

The sections of the history saving section 19 may be constituted of hardware resources such as LSIs. Software processing by a computer such as a CPU reading and executing a program to correct the initial attribute information and/or the second image, generate the additional attribute information and generate the history image can realize the same processing content as the hardware resources.

The image reading device 30 includes, as shown in FIG. 1 and FIG. 2, the image reading section 31.

As shown in FIG. 1, the image reading section 31 is a line sensor, an area sensor or the like disposed on the paper conveyance path. The image reading section 31 reads the image formed on the paper carried by the carrying unit 40 from the image forming device 10 and generates the bitmap second image.

Between the image reading device 30 and the image forming device 10, an image transfer path employing an interface such as PCI express is disposed. The second image generated by the image reading section 31 is transferred to the storage section 12 of the image forming device 10 via this image transfer path.

The external device 50 is a user terminal, a server, another image forming device or the like.

The external device 50 includes, as shown in FIG. 2, a storage section 51.

The storage section 51 can store (save) therein the initial attribute information generated by the image generating section 16, the additional attribute information and the history image generated in the history saving section 19 and the like, as with the storage section 12 of the image forming device 10.

As the storage section 51, a mass memory such as a hard disk can be used.

Figure 4:
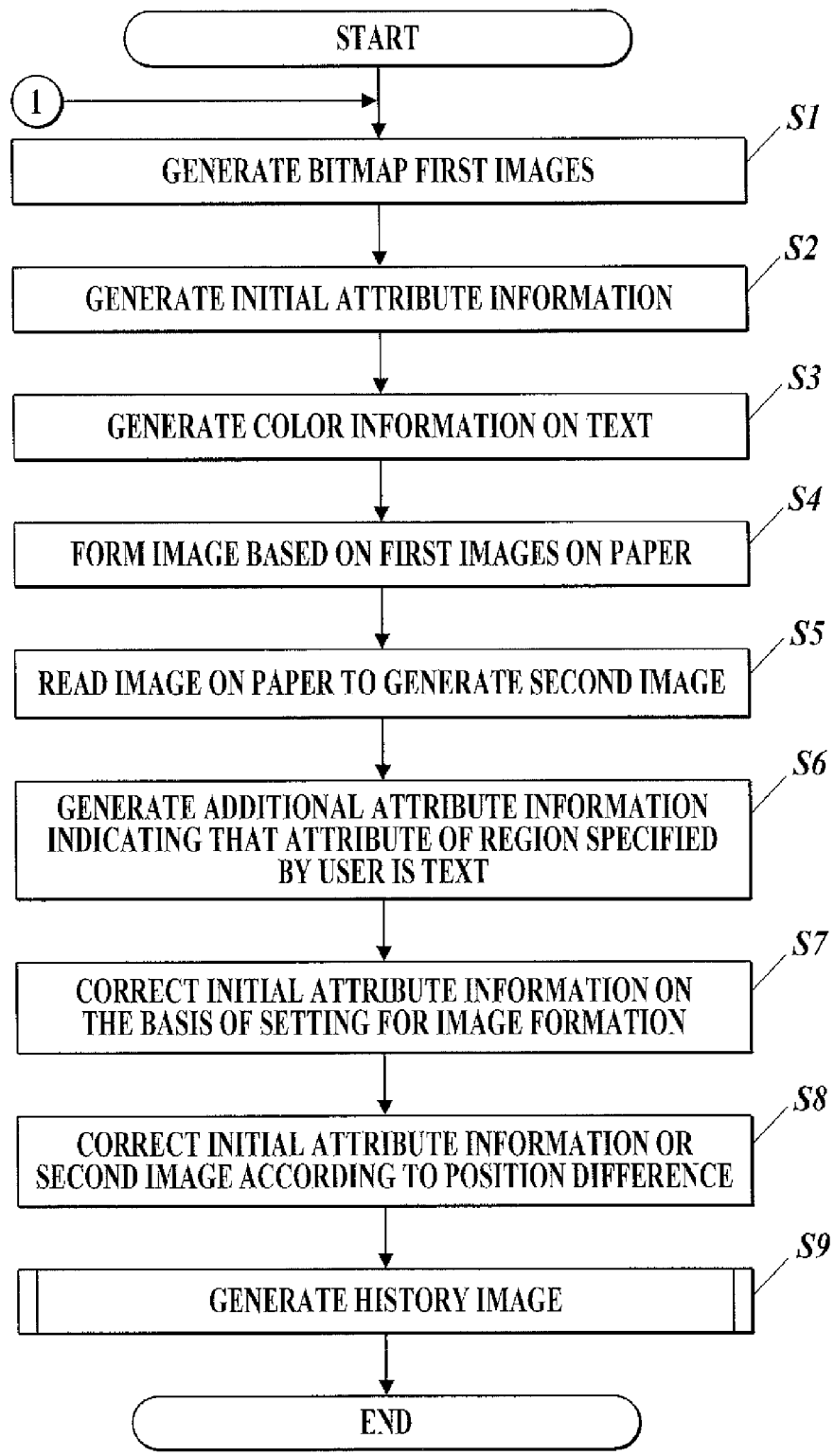
FIG. 4 is a flowchart showing a procedure by the image forming system to form an image and generate a history image.

FIG. 4 shows a procedure by the image forming system 1 to form an image on paper and generate the history image showing the history of performed image formation.

In the image forming system 1, when PDL data is sent, as shown in FIG. 4, the image generating section 16 rasterizes the PDL data so as to generate first images of one page (Step S1).

The image generating section 16 also generates initial attribute information indicating attributes of respective pixels of the first images and saves the initial attribute information in the storage section 12 (Step S2).

In the case where the image generating section 16 generates an image having the attribute Text in the first images, the image generating section 16 generates color information on the text and correlates and saves the color information with the initial attribute information in the storage section 12 (Step S3).

Through rasterization, C, M, Y and K images (first images) are generated. Hence, as the color information, C, M, Y and K gradation values of pixels which constitute the text can be used. Alternatively, R, G and B gradation values described in the PDL data as the color(s) of the text may be used as the color information. A text (character(s)) is often composed of a single color. Hence, the color information may be generated not on a pixel basis but on a character basis or on a character string basis to reduce the data amount of the color information.

When the image generating section 16 generates the first images, the image processing section 17 performs image processing, exemplified by gradation processing and halftone processing, on the first images. The image processing section 17 can perform the image processing with different conditions according to the attribute indicated by the initial attribute information by obtaining, from the storage section 12, the initial attribute information, which is generated together with the first images. For example, the image processing section 17 changes the number of screen lines according to the attribute.

The image processing section 17 can also perform image processing on the first images according to an application setting(s) for image formation. Examples of the image processing include position change of the first images, color change of the first images, image addition, image deleting, image transforming, image enlargement and image reduction.

Examples of the application settings include: page combining to arrange images of a plurality of pages on one page by reducing the images; page insertion to add (insert) an image of a page; zoom ratio change to enlarge or reduce an image of a page; repeat to arrange the same image multiple times on one page; centering to shift an image of a page to the center of the page; page margin to add a margin region by shifting an image of a page; date/time, page number and so forth to add an image of a text to a page; watermark, stamp and so forth to add an image of a logo or the like to a page; color adjustment; negative-positive reverse to reverse brightness (contrast) of an image of a page; mirror image to transform an image of a page into its mirror image; and frame erasing to erase the frame (four sides) of an image of a page.

The image forming section 18 forms an image on paper according to the gradation values of the pixels of the processed first images (Step S4).

The paper on which the image has been formed is carried to the image reading device 30 by the carrying unit 40. In the image reading device 30, the image reading section 31 reads the image on the paper so as to generate a second image (Step S5). The generated second image is transferred to the storage section 12 of the image forming device 10 so as to be saved therein.

When the second image is transferred, in the image forming device 10, the control section 11 makes the display section 14 display the operation screen with which a user can specify a region(s) in the second image as a text region(s).

In the history saving section 19, the attribute adding section 21 generates additional attribute information indicating that the attribute of the region specified by the user through the operation section 13 is Text and saves the additional attribute information in the storage section 12 (Step S6).

Depending on the attribute determining method employed by the image generating section 16, even when a drawn image is an image of a text, the attribute thereof may not be determined as Text. For example, as described above, in the case where the attribute of an image drawn on the basis of character codes is determined as Text and the attribute of an image drawn on the basis of a file in JPEG format or the like is determined as Image, the attribute of an image of a text filed in JPEG format or the like is determined as Image. Even in such a case, however, by generating additional attribute information indicating that the attribute of a region specified by a user is Text, the region can be accurately identified as a text region by the additional attribute information.

Figure 5:
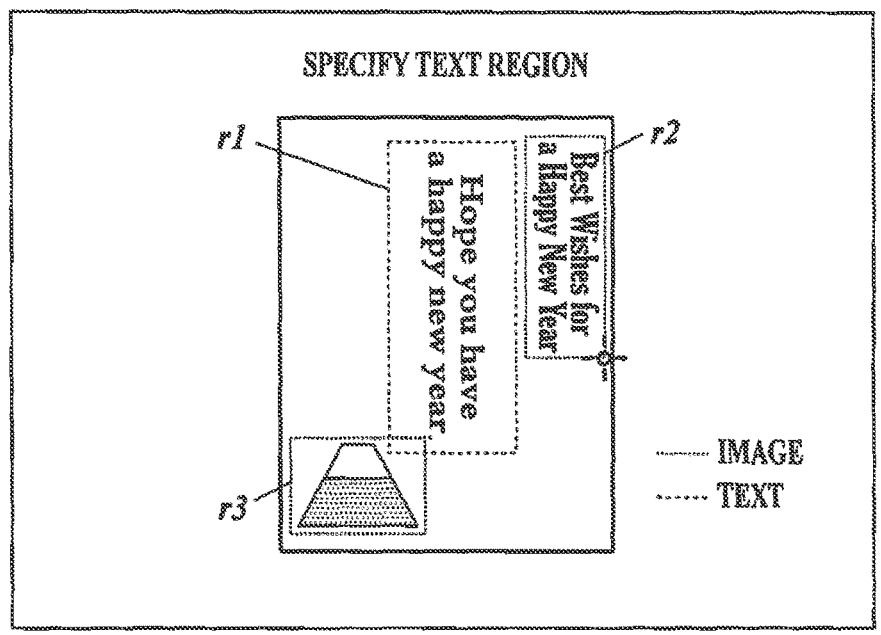
FIG. 5 shows an example of an operation screen with which a user can specify text regions in a second image.

FIG. 5 shows an example of the operation screen with which a user can specify text regions.

As shown in FIG. 5, a second image is displayed on the operation screen. An image region r1 in the second image is drawn on the basis of character codes, so that the image generating section 16 determines the attribute thereof as Text. On the other hand, an image region r2 is constituted of a text but drawn on the basis of a file in JPEG format, so that the image generating section 16 determines the attribute thereof as Image as with an image region r3 which is constituted of a picture drawn on the basis of a file in JPEG format.

When a user specifies the image region r2 as a text region on the operation screen, additional attribute information indicating that the attribute of the image region r2 is Text is generated.

In the history saving section 19, the attribute correcting section 22 corrects, on the basis of the settings for image formation, the initial attribute information generated by the image generating section 16 in such a way as to indicate not the attributes of the first images at the time of being generated but the attributes of the first images processed by the image processing section 17 (Step S7). Using the corrected attribute information can accurately separate a text region(s) from the second image.

For example, in the case of the application setting of page combining to arrange first images of two pages on one page by reducing the images, in the same way as the above-described image processing, the attribute correcting section 22 performs correction to arrange the initial attribute information of the two pages on the one page by reducing the initial attribute information of the two pages.

In the case of the application setting of page insertion to insert additional one page into between the first page and the second page, the attribute correcting section 22 performs correction to insert the initial attribute information of the additional one page into between the initial attribute information of the first page and the initial attribute information of the second page. In the case of the application setting of repeat, the attribute correcting section 22 performs correction to arrange the initial attribute information of a page multiple times on a page by copying the initial attribute information of the page the multiple times.

In the case of the application setting of zoom ratio change to enlarge or reduce an image of a page, the attribute correcting section 22 performs correction to enlarge or reduce the initial attribute information of the page in such a way as to agree with the degree of enlargement or reduction of the image of the page.

In the case of the application setting of centering, page margin or the like to shift an image of a page, the attribute correcting section 22 performs correction to shift pixel-corresponding segments having the respective attributes in the initial attribute information of the page in such a way as to agree with the shifted image of the page.

In the case of the application setting of page number, date/time or the like to add an image of a text to a page, the attribute correcting section 22 performs correction to change attributes of pixels which constitute the added image to Text. In the case of the application setting of stamp, watermark or the like to add an image of graphics to a page, the attribute correcting section 22 performs correction to change attributes of pixels which constitute the added image to Graphics.

In the case of the application setting of negative-positive reverse, mirror image or the like to edit an image of a page, the attribute correcting section 22 performs correction to change attributes of the image of the page in such a way as to agree with the edited image of the page. For example, in the case where a text is mirror-imaged, the attribute correcting section 22 changes attributes of pixels not constituting the text before mirror imaging but constituting the text after mirror imaging to Text and changes attributes of pixels constituting the text before mirror imaging but constituting the background after mirror imaging to Background.

The attribute correcting section 22 can also correct the color information on the text on the basis of the settings for image formation.

For example, in the case of the application setting of color adjustment, negative-positive reverse or the like to edit an image of a page, the attribute correcting section 22 changes (corrects) color information on a text in the image of the page saved in the storage section 12 in such a way as to agree with the color(s) of the edited text.

Next, the position correcting section 23 corrects either the initial attribute information, corrected by the attribute correcting section 22, or the second image such that the position of the text indicated by the corrected attribute information matches the position of the text in the second image (Step S8).

The text in the second image may incline with respect to the text in the first images owing to the paper inclining while being carried. Further, the text in the second image may be smaller than the text in the first images owing to the paper shrinking by image fixation. Thereby, displacement may occur between the text indicated by the initial attribute information generated about the first images and the text in the second image. This displacement makes it difficult to accurately separate the text region from the second image by using the initial attribute information.

Figure 6A:
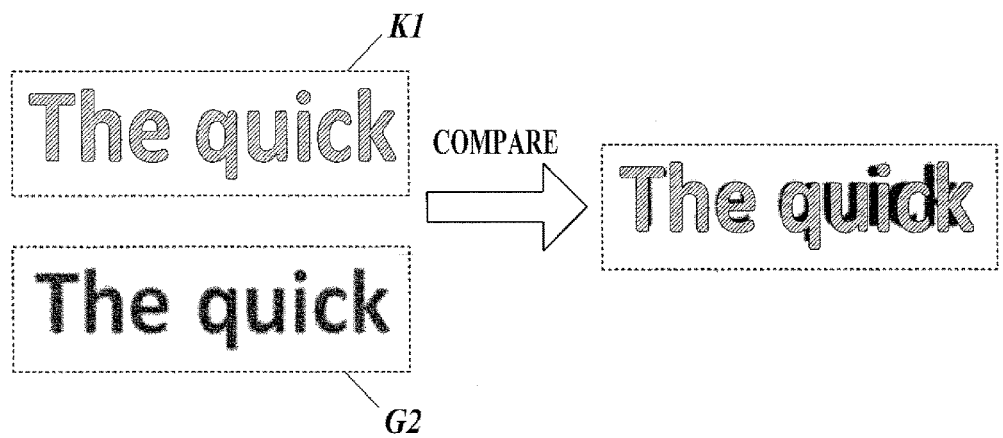
FIG. 6A shows a text region in initial attribute information and the text region in a second image displaced from the initial attribute information.

FIG. 6A shows initial attribute information K1 generated together with first images which contain a text "The quick". The oblique-line parts in the initial attribute information K1 indicate pixels having the attribute Text in the first images.

Figure 6B:
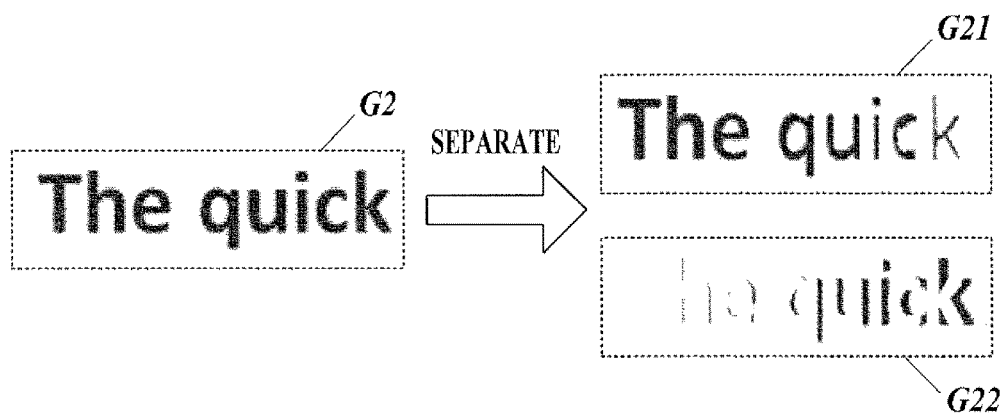
FIG. 6B shows the text region separated from the second image by using non-corrected initial attribute information.

If paper shrinks while an image based on the first images is formed thereon, the text in a second image G2 generated by reading the image on the paper is slightly smaller than the text in the first images. Hence, when the second image G2 and the initial attribute information K1 are compared with each other, as shown in FIG. 6A, the position of the text in the second image G2 is different from the position of the text indicated by the initial attribute information K1. If an attempt is made to separate the text region "The quick" from the second image G2 by using the initial attribute information K1 in a state in which the position difference occurs, as shown in FIG. 6B, the entire text is not separated as a text region G21, and a part of the text is separated as a background region G22, which is a non-text region.

Then, the position correcting section 23 corrects either the initial attribute information or the second image, whereby the position of the text indicated by the initial attribute information matches the position of the text in the second image.

The position correcting section 23 may correct the position of the text indicated by the initial attribute information so as to match the position of the text in the second image or correct the position of the text in the second image so as to match the position of the text indicated by the initial attribute information. It is preferable that not the second image but the initial attribute information be corrected because then the generated second image with no change can be used for the history image, which increases reliability of the history.

For this position adjustment, the position correcting section 23 extracts one or more sets (pairs) of rectangular regions from the initial attribute information and the second image, respectively, the rectangular regions of each set circumscribing a text region. More specifically, the position correcting section 23 extracts, from the initial attribute information, a rectangular region circumscribing a text region, which has the attribute Text, and extracts, from the second image, a region having, as the contour, the edge detected by edge detection or the like in the vicinity of the text region indicated by the initial attribute information as a rectangular region. The position correcting section 23 corrects either the rectangular region extracted from the initial attribute information or the rectangular region extracted from the second image of each set according to the difference between the rectangular regions of each set in width, height, inclination angle and/or coordinates.

Figure 7:
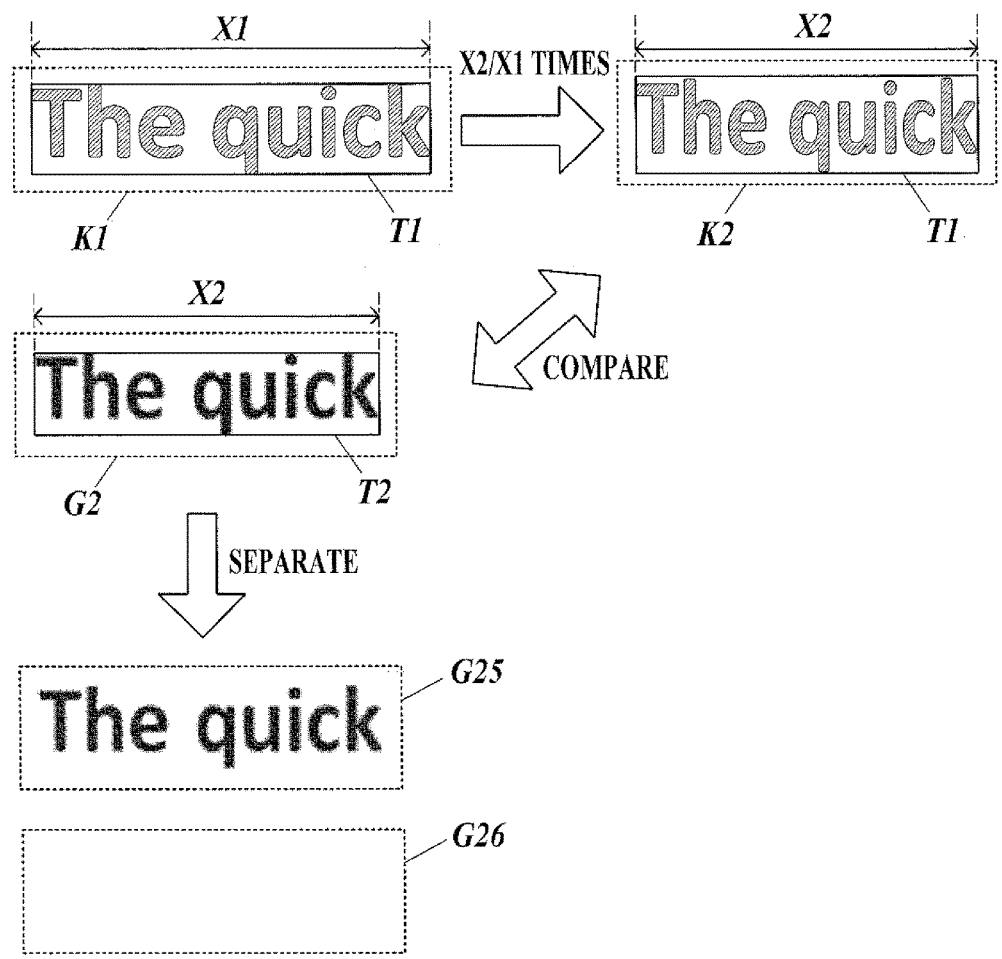
FIG. 7 shows the text region separated from the second image by using corrected initial attribute information.

For example, as shown in FIG. 7, the position correcting section 23 extracts, from the initial attribute information K1, a rectangular region T1 circumscribing the text region (region shown by oblique lines) "The quick", which has the attribute Text, and extracts, from the second image G2, a rectangular region T2 circumscribing the text region "The quick" by identifying the text region "The quick" in the second image G2. The position correcting section 23 calculates a ratio of a width X2 of the rectangular region T2 to a width X1 of the rectangular region T1 as the difference in width and multiplies the width of the rectangular region T1 in the initial attribute information K1 by X2/X1 as the correction. Thereby, the width X1 of the rectangular region T1 in the initial attribute information K1 matches the width X2 of the rectangular region T2 in the second image G2. Similarly, the heights thereof can be made to match each other.

When the corrected attribute information, namely, K2, is compared with the second image G2, and the text region is separated from the second image G2, as shown in FIG. 7, the entire text in the second image G2 can be accurately separated as a text region G25 without leaving any part of the text in a background region G26.

In the case where the correction is performed according to the difference in inclination angle, the position correcting section 23 calculates an inclination angle of the rectangular region T2 to the rectangular region T1 and rotates the rectangular region T1 at the inclination angle.

In the case where the correction is performed according to the difference in coordinates, the position correcting section 23 performs an affine transformation on the rectangular region T1 such that the positions of the four apexes of the rectangular region T1 match the positions of the four apexes of the rectangular region T2 in the second image G2.

Instead of correcting either the rectangular region extracted from the initial attribute information or the rectangular region extracted from the second image of each set by calculating the difference of each set, the position correcting section 23 may correct either the rectangular regions extracted from the initial attribute information or the rectangular regions extracted from the second image of the sets all together by calculating the average of the differences of the sets.

The former, namely, performing the correction set by set by calculating the difference set by set, can perform the position adjustment with high accuracy, whereas the latter, namely, performing the correction on the sets all together by calculating the average of the differences of the sets, can shorten a process time required for the correction.

As the average of the differences of the sets, the position correcting section 23 may calculate the average of the differences calculated with respect to the respective sets or may calculate a paper position difference (the amount of displacement of paper) detected from the second image.

Figure 8:
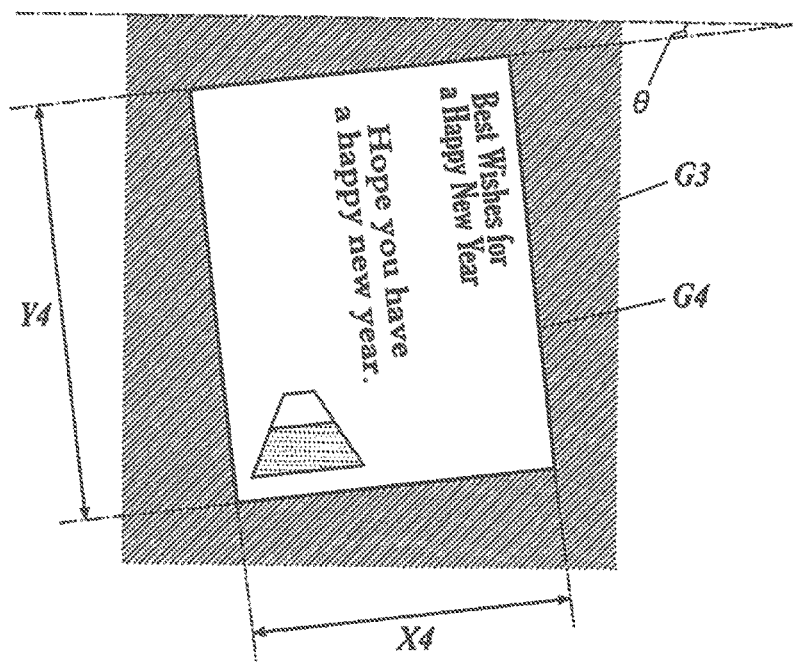
FIG. 8 shows an image region of paper (paper image region) in a second image.

In general, a reading range of the image reading section 31 is larger than paper, and an as shown in FIG. 8, a paper image region G4 in a second image G3 and its background are largely different in brightness. Hence, the contour of the paper image region G4 can be easily detected with an edge detection filter or the like . The position correcting section 23 calculates, as the average of the differences between the rectangular regions of the sets in width, a width X4 of the paper image region G4 and calculates a ratio X4/X3, wherein X3 represents the width of the paper before image formation. The position correcting section 23 can correct all the rectangular regions together by multiplying the widths of all the rectangular regions extracted from the initial attribute information by X4/X3.

As the average of the differences between the rectangular regions of the sets in height, a ratio Y4/Y3 is calculated, wherein Y3 represents the height of the paper before image formation, and Y4 represents the height of the paper image region G4.

The position correcting section 23 may calculate an angle formed by the top end of the second image G3 and the top end of the paper image region G4 as the average of inclination angles of the rectangular regions of the sets (i.e., the averages of the differences between the rectangular regions of the sets in inclination angle). The position correcting section 23 may also calculate the difference between coordinates of the four corners of the paper image region G4 and predetermined coordinates of the four corners of paper in the second image G3 as the average of the differences between the rectangular regions of the sets in coordinates. The position correcting section 23 can correct all the rectangular regions extracted from the initial attribute information together by rotating the rectangular regions extracted therefrom at the angle θ or by performing an affine transformation on the rectangular regions extracted therefrom such that the coordinates of the four corners of the paper image region G4 match the predetermined coordinates of the four corners of paper in the second image G3.

Next, the history generating section 20 obtains the second image from the storage section 12 so as to generate the history image by using the obtained second image (Step S9). Note that when the position correcting section 23 corrects not the initial attribute information but the second image, the history generating section 20 uses the second image corrected by the position correcting section 23 and corrects the additional attribute information generated by the attribute adding section 21 in accordance with the second image corrected by the position correcting section 23.

Figure 9:
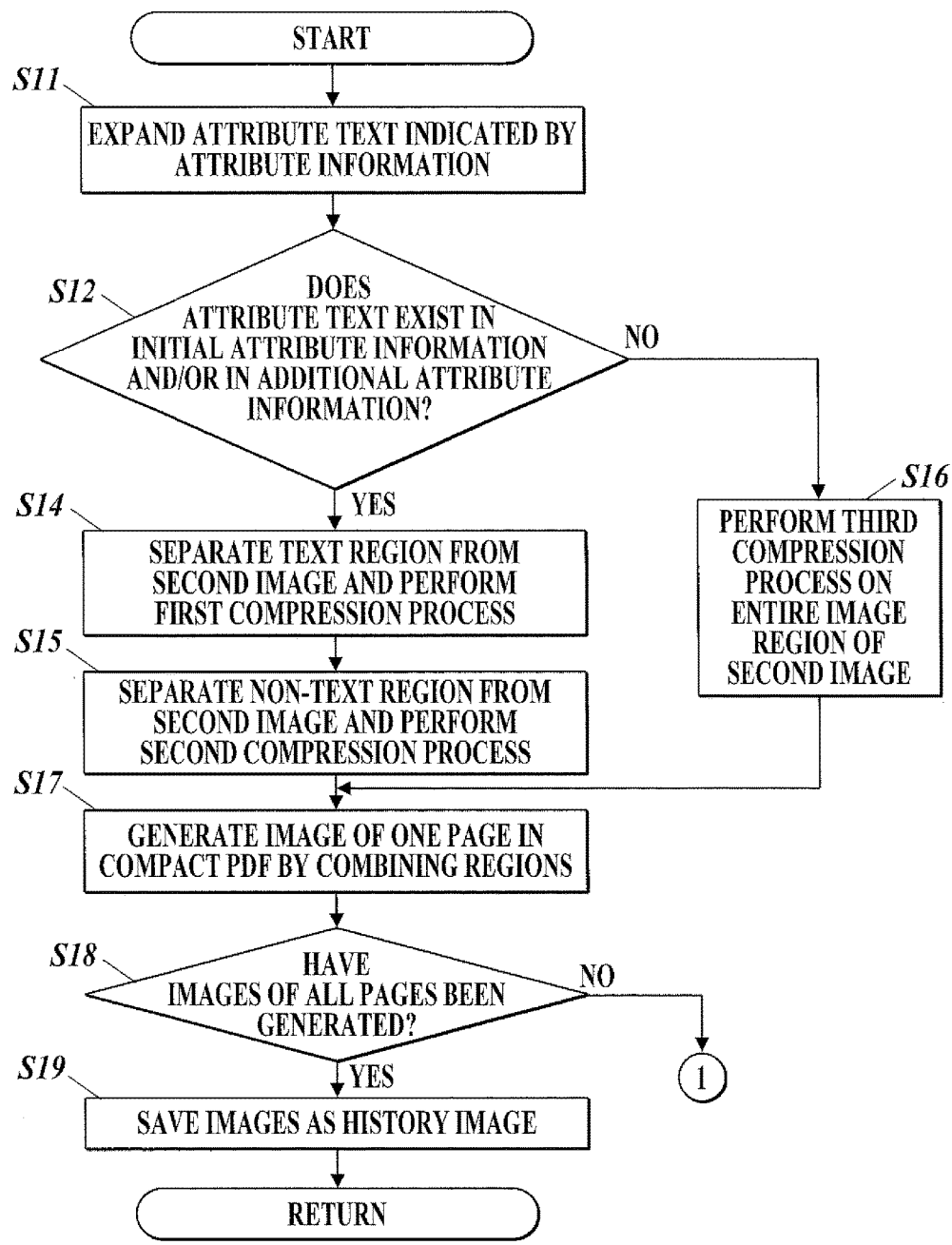
FIG. 9 is a flowchart showing a procedure by a history generating section to generate the history image.

FIG. 9 shows a procedure for the history generating section 20 to generate the history image.

As shown in FIG. 9, the history generating section 20 expands the attribute Text indicated by the attribute information obtained from the position correcting section 23 and the attribute Text indicated by the attribute information obtained from the attribute adding section 21 (Step S11).

Figure 10:
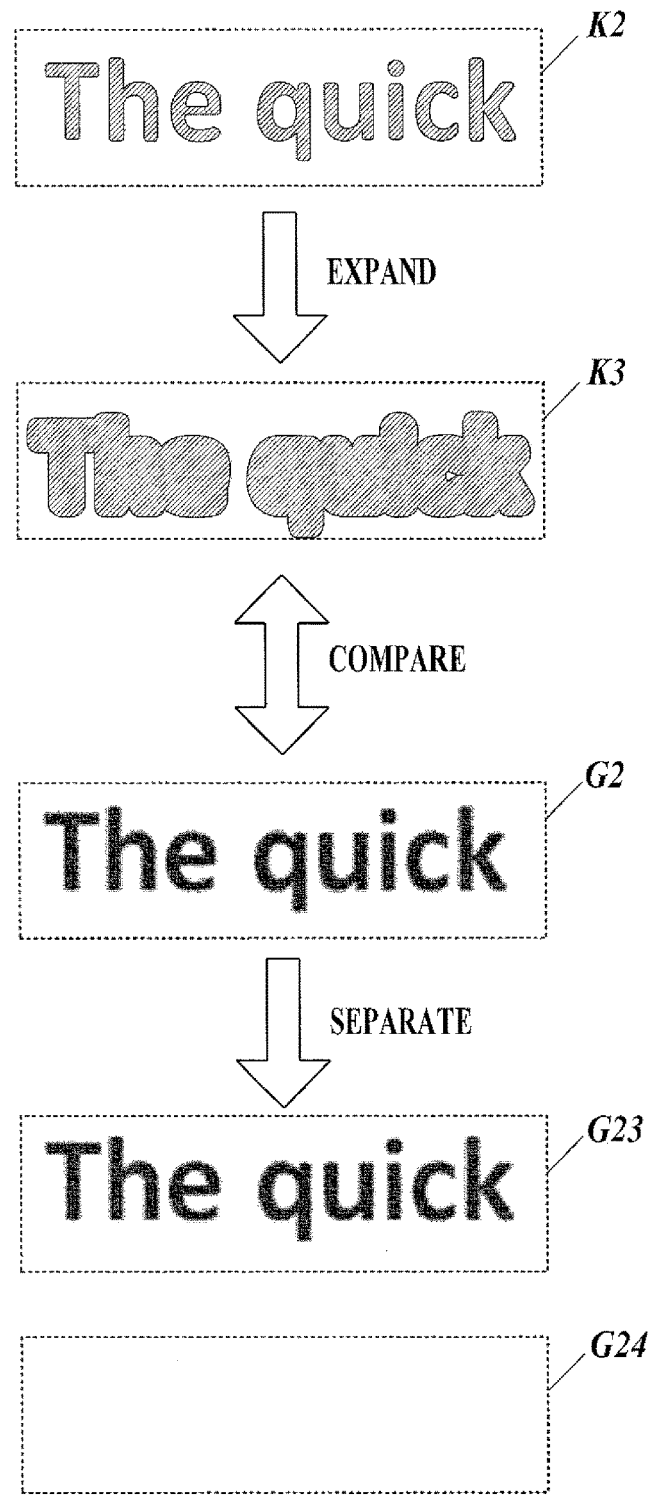
FIG. 10 shows a process of separating the text region from the second image by using the initial attribute information having an attribute Text expanded.

More specifically, as shown in FIG. 10, the history generating section 20 changes the attribute of a region within a predetermined distance from the text region in the attribute information K2 to Text so as to expand the text region indicated by the attribute information K2. The predetermined distance can be specified appropriately. If displacement of about several pixels tends to occur, the attribute of a region within a distance of, for example, five pixels from the text region may be changed to Text.

When the attribute information K3 having the expanded attribute Text is compared with the second image G2, and the text region is separated from the second image G2, as shown in FIG. 10, the entire text in the second image G2 can be accurately separated as a text region G23 without leaving any part of the text in a background region G24.

As described above, correcting the attribute information and also expanding the attribute Text in the attribute information can separate text regions with higher accuracy. However, text regions can be accurately separated even when only one of the above two is performed.

The history generating section 20 determines whether or not the attribute Text exists in the attribute information obtained from the position correcting section 23 and/or in the attribute information obtained from the attribute adding section 21 (Step S12). When determining that the attribute Text exists in the attribute information obtained from the position correcting section 23 and/or in the attribute information obtained from the attribute adding section 21 (Step S12; YES), the history generating section 20 identifies the text region in the second image by using each attribute information determined as having the attribute Text.

For identification of a text region, the history generating section 20 can identify the text region on the basis of not only the attribute information but also the color information on the text. More specifically, the history generating section 20 identifies a region having the attribute Text according to the attribute information and having a color matching the color indicated by the color information as a text region. Hence, an image region of dirt or the like can be ruled out as a text region.

The history generating section 20 separates a rectangular region circumscribing the text region, which is identified in the second image by using each attribute information, as a text image layer from the second image and performs a first compression process on the text image layer (Step S14). In the case where a background image exists in the periphery of the text and/or a base color is set, the history generating section 20 fills in the region in the periphery of the text in the text image layer with the background image and/or the base color.

The history generating section 20 separates the region other than the identified text region (i.e., the rectangular region circumscribing the text region) as a background image layer from the second image and performs a second compression process on the background image layer (Step S15). In the case where a base color is set, the history generating section 20 separates the base image component as a base layer from the background image layer and performs the second compression process on the background image layer and the base layer.

The process condition for the first compression process is that image quality deterioration by the first compression process is smaller than that by the second compression process. For example, the compression rate of the first compression process is lower than that of the second compression process. Further, the compression format of the first compression process is a lossless format such as PNG or MMR which is suitable for binary images, whereas the compression format of the second compression process is a lossy format such as JPEG which has a high compression rate and is suitable for images having a large number of colors, for example. In particular, as the compression format for texts, PNG or the like which allows a transparent process is preferable.

The history generating section 20 may perform one or more of gradation processing, filtering, color conversion and resolution conversion as image processing before the compression processes. In order to achieve higher compression and obtain high-quality images even after the compression processes, the history generating section 20 may change the type of and/or the process condition for the image processing to perform according to the image layer being the text image layer or the background image layer, which is the non-text image layer.

For example, in the case of gradation processing, gradation processing to binarize gradation values of pixels can be performed on the text image layer so as to reproduce a clear text even after the compression process, whereas gradation processing to correct gradation values of pixels such that density characteristics of a formed image match target density characteristics can be performed on the background image layer so as to increase reproducibility of gradations of a picture or the like.

Similarly, in the case of filtering, filtering to make an image clear can be performed on the text image layer so as to reproduce a clear text even after the compression process, whereas filtering using a moving average filter can be performed on the background image layer so as to increase reproducibility of gradations of a picture or the like and to achieve higher compression.

Further, color conversion to convert multiple colors into a single color, thereby reducing the number of colors, can be performed on the text image layer so as to reproduce a clear text.

On the other hand, when determining that the attribute Text does not exist either in the attribute information obtained from the position correcting section 23 or in the attribute information obtained from the attribute adding section 21 (Step S12; NO), the history generating section 20 separates the entire image region of the second image as a background image layer and performs a third compression process on the background image layer (Step S16).

The process condition for the third compression process is that image quality deterioration by the third compression process is larger than that by the first compression process but smaller than that by the second compression process. In the case where the process condition is regarding the compression rate, the compression rates of the first to third compression processes satisfy a relationship "compression rate of first compression process<compression rate of third compression process<compression rate of second compression process".

When the attribute Text does not exist either in the attribute information obtained from the position correcting section 23 or in the attribute information obtained from the attribute adding section 21, a possibility remains that a text the attribute of which is not specified as Text either by the PDL data or by a user. When a text does not have the attribute Text, the text cannot be separated as a text image layer. As a result, although it is a text, a compression process having a high compression rate is performed thereon as a background image layer, which deteriorates image quality of the text. Therefore, when the attribute Text does not exist in the additional attribute information either, the compression process which is higher compression than the compression process on a text image layer but lower compression than the compression process on a background image layer is performed so as to prevent image quality deterioration of a possible text in the background image layer.

The history generating section 20 combines the compressed text image layer, background image layer and base layer so as to generate an image of one page in compact PDF (Step S17). The compact PDF is, as described above, a format, after separating an image of a page into a plurality of image layers and performing different compression processes on the image layers, to combine the image layers so as to generate a PDF file.

The compact PDF allows different compression processes to be performed on respective layers, so that the compact PDF can realize higher compression and higher image quality than the normal PDF.

Figure 11A:
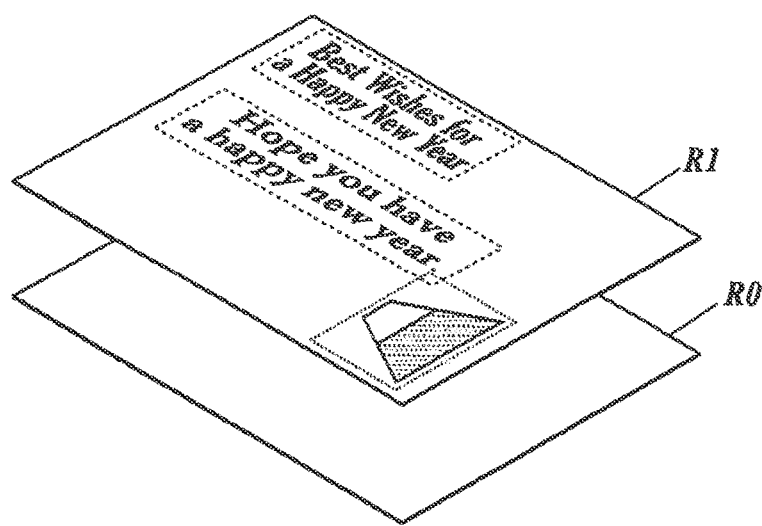
FIG. 11A shows an image separated into image layers in normal PDF.

For example, in the case where an image of one page is generated in the normal PDF, as shown in FIG. 11A, the image of one page is separated into an image layer containing images of texts, pictures and graphics and a base layer, namely, an image layer R1 containing images of texts and a picture and a base layer R0 in the case shown in FIG. 11A. Because the compression process is performed layer by layer, the same compression process is performed regardless of the attribute Text, the attribute Graphics or the attribute Image. If the compression process is performed by JPEG, the compression process does not greatly deteriorate image quality of an image having the attribute Image because gradation change of the image having the attribute Image is gradual, but greatly deteriorates image quality of an image having the attribute Text because gradation change of the image having the attribute Text is sharp, which makes it difficult to identify a text (character(s)).

Figure 11B:
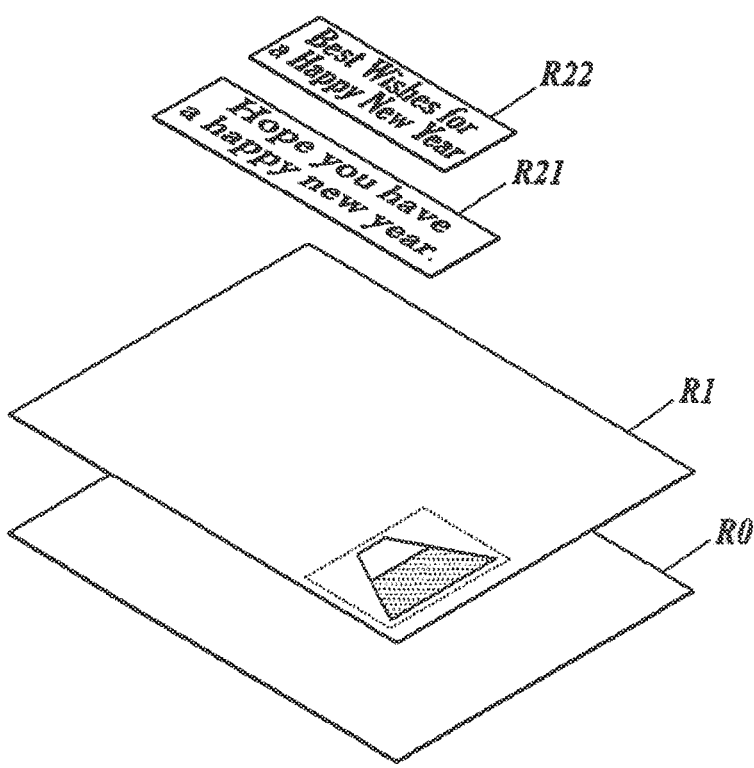
FIG. 11B shows the image separated into image layers in compact PDF.

On the other hand, in the case where an image of one page is generated in the compact PDF, as shown in FIG. 11B, the above-described image layer R1 is separated into text image layers R21 and R22 and a background image layer R1. Because the compression process is performed layer by layer, a compression process which does not greatly deteriorate image quality and is suitable for reproduction of texts can be performed on the text image layers R21 and R22, whereas a compression process which has a high compression rate and is excellent, for example, in reproducibility of the color and gradation can be performed on the background image layer R1, which can realize both high compression and high image quality.

When images of all the pages have not been generated yet (Step S18; NO), the procedure returns to Step S1 and the above-described steps are repeated for the next page. When images of all the pages have been generated (Step S18; YES), the history generating section 20 combines the images in the compact PDF of all the pages so as to generate the history image and save the history image in the storage section 12 (Step S19).

As described above, the image forming system 1 of the embodiment includes: the image generating section 16 which generates a bitmap first image(s) and generates initial attribute information indicating attributes of respective pixels of the first image(s); the image reading section 31 which reads an image based on the first image(s) formed on paper so as to generate a bitmap second image; and the history generating section 20 which separates the second image into image regions by attribute indicated by the initial attribute information, performs image processing on each of the image regions according to the attribute and combines the image regions so as to generate a history image.

Consequently, the text region and the non-text region are separated from each other, and different compression processes can be performed on the text (text region) and the non-text (non-text region). Increasing the compression rate for the non-text region can reduce the data amount of the history image. Meanwhile, using the compression format having high reproducibility of texts keeping the compression rate low for the text region can generate a high-quality history image in which texts (characters) can be identified. The initial attribute information generated together with the first images used for image formation is used for determination of attributes of the second image, so that no process is necessary for determination of attributes of the second image and therefore the history image can be generated efficiently at low costs.

Thus, a high-quality history image having a small data amount can be generated efficiently.

The above embodiment is one preferred example of the present invention, and the present invention is not limited thereto. The present invention can be appropriately modified without departing from the spirit of the present invention.

For example, the image generating section 16 may send the initial attribute information to the external device 50 through the communication section 15 so as to save the initial attribute information in the storage section 51 of the external device 50, and accordingly the history generating section 20 obtains the initial attribute information from the storage section 51. Similarity, the history image generated by the history generating section 20 may be saved in the storage section 51 of the external device 50.

In the above embodiment, the image forming device 10 includes the history generating section 20 and generates the history image by obtaining the second image from the image reading device 30. Alternatively, the image reading device 30 may include the history generating section 20 and generate the history image. With respect to the other sections of the history saving section 19 too, where they are disposed is not particularly limited.

Further, in the above embodiment, in order that the image on paper is read immediately after the image is formed thereon, the image reading section 31 disposed on the paper conveyance path generates the second image, but the image reading section 161 may be utilized to generate the second image. In this case, after a job is completed, the image reading section 161 reads the images on pages (sheets) of paper set by a user, and the history saving section 19 generates the history image of the job. By saving the initial attribute information about the first images of one job in the storage section 12 or the storage section 51 of the external device 50, the attribute information can be utilized when the history image of the job is generated.

Further, the control section 11 may read the program, which is read by the sections of the history saving section 19 when the sections of the history saving section 19 perform the above procedure, so as to perform the above procedure. Further, instead of the image forming system, a computer such as a general-use PC may read the program(s) so as to perform the above procedure.

As a computer readable medium storing the programs therein, a nonvolatile memory such as a ROM or a flash memory or a portable storage medium such as a CD-ROM can be used. Further, as a medium to provide data of the programs via a communication line, a carrier wave can be used.

This application is based upon and claims the benefit of priority under 35 U.S.C. 119 of Japanese Patent Application No. 2014-208753 filed Oct. 10, 2014, the entire disclosure of which, including the specification, claims, drawings and abstract, is incorporated herein by reference in its entirety.

What is claimed is:

1. A history generating apparatus comprising:
   a central processing unit (CPU);
   a storage connected to the CPU;
   an image generating section connected to the CPU and that generates a bitmap of a first image by rasterization and generates initial attribute information indicating attributes of respective pixels of the first image;
   an image reading section connected to the storage and that reads an image of the first image formed on paper to generate a bitmap second image; and
   a history saving section connected to the CPU and that separates the second image into image regions by attribute indicated by the initial attribute information, performs image processing on each of the image regions according to the attribute, and combines the image regions so as to generate a history image,
   wherein:
   the image generating section saves the initial attribute information in the storage of the history generating apparatus or a storage of an external device connected to the history generating apparatus, and
   the history saving section obtains the initial attribute information from the storage in which the initial attribute information is saved.

2. The history generating apparatus according to claim 1, wherein
   the history saving section separates the second image into a text region constituted of a text and thereby having an attribute text and a non-text region not having the attribute text as the image regions, and performs a first compression process on the text region and a second compression process on the non-text region as the image processing, and
   a process condition for the first compression process is that image quality deterioration by the first compression process is smaller than the image quality deterioration by the second compression process.

3. The history generating apparatus according to claim 2 further comprising:
   an operation section connected to the CPU and through which a user specifies a region in the second image as a text region, wherein
   the history saving section generates additional attribute information indicating that the attribute of the region specified by the user through the operation section is the attribute text, wherein
   the history saving section performs the first compression process on the text region which is separated from the second image by using the initial attribute information and the text region which is separated from the second image by using the additional attribute information.

4. The history generating apparatus according to claim 3, wherein
   the history saving section performs a third compression process on the second image as the image processing when the attribute text does not exist in either the initial attribute information or the additional attribute information, and
   the process condition for the third compression process is that the image quality deterioration by the third compression process is smaller than the image quality deterioration by the second compression process.

5. The history generating apparatus according to claim 2, wherein the history saving section performs one or more of gradation processing, filtering, color conversion and resolution conversion as image processing on each of the image regions, and changes a type of and/or a process condition for the image processing according to each of the image regions being the text region or the non-text region.

6. The history generating apparatus according to claim 2, wherein
   the image generating section generates color information indicating a color of the text in the first image, and
   the history saving section separates a region having the attribute text according to the initial attribute information and having a color matching the color indicated by the color information from the second image as the text region.

7. The history generating apparatus according to claim 2, wherein the history saving section changes the attribute of a region within a predetermined distance from the text region in the initial attribute information to the attribute text so as to expand the text region indicated by the initial attribute information, and separates the text region from the second image by using the changed initial attribute information.

8. The history generating apparatus according to claim 2, wherein the history saving section corrects either the initial attribute information or the second image such that a position of the text indicated by the initial attribute information matches a position of the text in the second image, and
   the history saving section generates the history image by using either the initial attribute information or the second image corrected by the history saving section.

9. The history generating apparatus according to claim 8, wherein the history saving section extracts one or more sets of rectangular regions from the initial attribute information and the second image, the rectangular regions of each of the sets circumscribing the text region, and corrects either the rectangular region extracted from the initial attribute information or the rectangular region extracted from the second image of each of the sets according to a difference between the rectangular regions of each of the sets in one or more of width, height, inclination angle and coordinates.

10. The history generating apparatus according to claim 8, wherein the history saving section extracts a plurality of sets of rectangular regions from the initial attribute information and the second image, the rectangular regions of each of the sets circumscribing the text region, and corrects either the rectangular regions extracted from the initial attribute information or the rectangular regions extracted from the second image of the sets all together according to an average of differences between the rectangular regions of the sets in one or more of width, height, inclination angle and coordinates.

11. The history generating apparatus according to claim 2, wherein the history saving section corrects the initial attribute information on the basis of a setting for image formation, wherein
the history saving section separates the text region from the second image by using the corrected initial attribute information.

12. The history generating apparatus according to claim 1 further comprising an image forming section connected to the CPU and that forms the image based on the first image on the paper, wherein
the image reading section reads the image formed on the paper by the image forming section so as to generate the second image.

13. A history generating method comprising:
generating a bitmap of a first image by rasterization and generating initial attribute information indicating attributes of respective pixels of the first image;
reading an image of the first image formed on paper to generate a bitmap second image; and
separating the second image into image regions by attribute indicated by the initial attribute information, performing image processing on each of the image regions according to the attribute and combining the image regions so as to generate a history image,
saving the initial attribute information in a storage of a history generating apparatus or a storage of an external device connected to the history generating apparatus, and
obtaining the initial attribute information from the storage in which the initial attribute information is saved.

* * * * *